United States Patent [19]

Dimmer et al.

[11] 3,844,702
[45] Oct. 29, 1974

[54] CENTRIFUGAL CASTING AND CURING APPARATUS

[75] Inventors: Charles L. Dimmer, Toledo, Ohio; Eric Perry, Arcadia, Calif.

[73] Assignee: Nobilium Products, Inc., Los Angeles, Calif.

[22] Filed: Dec. 4, 1972

[21] Appl. No.: 311,759

[52] U.S. Cl. .............................. 425/425, 425/435
[51] Int. Cl. ....................... B29c 5/04, B29c 25/00
[58] Field of Search .......... 425/425, 175, 179, 435, 425/434, 73; 164/62, 114, 118, 290

[56] References Cited
UNITED STATES PATENTS

| 1,502,435 | 7/1924 | Morgan | 164/290 X |
| 1,720,719 | 7/1929 | Casto | 425/425 X |
| 1,871,137 | 8/1932 | Underdahl | 425/175 |
| 2,829,408 | 4/1958 | Shuck | 164/290 X |
| 3,754,852 | 8/1973 | Rempel | 425/435 X |

FOREIGN PATENTS OR APPLICATIONS

1,217,590  5/1966  Germany ........................... 425/434

Primary Examiner—J. Spencer Overholser
Assistant Examiner—David B. Smith
Attorney, Agent, or Firm—Spensley, Horn & Lubitz

[57] ABSTRACT

An apparatus for simultaneous centrifugally casting a plurality of objects such as dental restorations and for curing the cast objects is disclosed. The casting and curing are performed in the same pressure vessel, eliminating the need to move the newly cast objects before curing. The curing is performed in an automatically controlled environment under pressure; water is used to evenly distribute heat during the curing.

14 Claims, 10 Drawing Figures

PATENTED OCT 29 1974 3,844,702

CENTRIFUGAL CASTING AND CURING APPARATUS

BACKGROUND OF THE INVENTION

1. Field of the Invention

The invention relates to the field of devices for centrifugally casting and then curing objects, particularly dental restorations.

2. Background of the Invention

Centrifugal casting is well known in the prior art and to a limited extent has been used for the casting of dental restorations. The applicants believe that there is one commercial centrifugal casting apparatus in which some curing is performed but this apparatus does not use a liquid such as water to provide temperature control during curing, in addition it lacks other features of the present invention.

Most typically in the prior art, dental restorations are manually cast, one at a time, and then cured in a separate pressure vessel. This procedure is laborious and hence costly. With the presently invented device there is substantial cost reduction not only because several castings are made simultaneously but also since the curing occurs in the same apparatus. This saves labor and lessens the chances of casting and curing defects associated with improper handling. Additionally, the quality of the finished product with the prior art manual casting process is not as good as with the disclosed casting and curing apparatus, mainly because of the shrinkage associated with this manual process. It has been found that with use of the presently disclosed centrifugal casting and curing device shrinkage is reduced by 50 to 80 percent over the manual process. This reduced shrinkage is believed to be primarily caused by the centrifugal casting but is also aided by the improved curing of the disclosed device.

Often with the prior art manual process poor quality castings are produced because the proper curing time and temperature are not properly followed. In the newly developed and disclosed apparatus the curing time and temperature are automatically controlled, eliminating this type of processing error.

SUMMARY OF THE INVENTION

A centrifugal casting and curing apparatus particularly suitable for producing dental restorations, which includes a pressure vessel is described. The apparatus includes a flask removably coupled to a rotor disposed in the pressure vessel and which receives up to five (5) molds. By pouring a casting material such as acrylic resin into the central section of the flask, the five (5) objects represented by the molds may be simultaneously cast as the flask rotates. After the casting is completed, water and pressure control means allows the vessel to be flooded and pressurized. Automatically controlled heating means heat the water to a predetermined temperature and for a predetermined time to cure the castings.

DETAILED DESCRIPTION OF THE INVENTION

Figure 1:
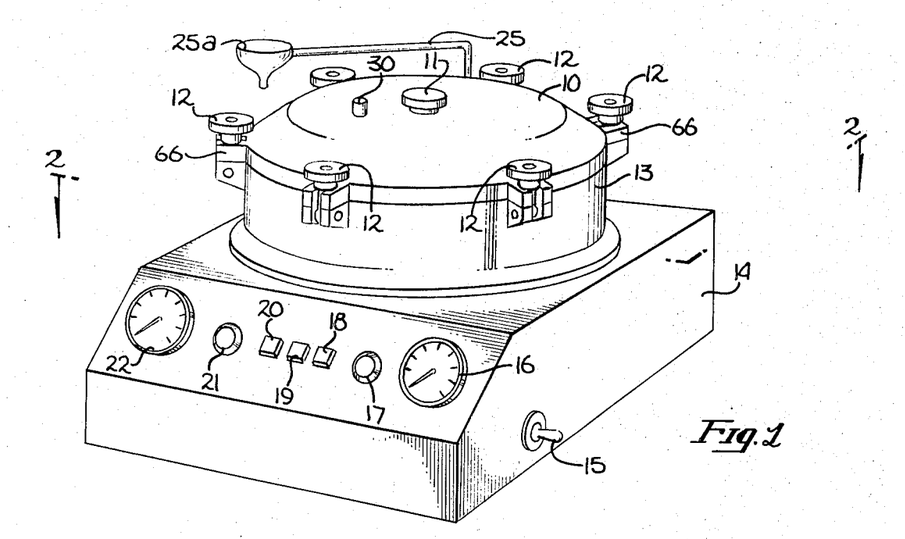
FIG. 1 is a perspective view of the invented centrifugal casting and curing apparatus.

Referring first to FIG. 1, the centrifugal casting and curing machine is illustrated therein and includes a generally rectangular base housing 14 upon which a cylindrically shaped pressure vessel is mounted. The pressure vessel includes the pressure vessel body 13 and a lid 12 which is coupled to the body of the pressure vessel by means of a plurality of clamps 12. A handle 11 is concentrically mounted on the outer surface of lid 10 allowing the lid to be readily removed from the pressure vessel body 13. A pressure relief valve 30 is mounted within the lid 10 and in the presently preferred embodiment this valve is set to relieve pressure from within the vessel at approximately 35 PSI (the normal operating pressure for the vessel is 25 PSI). A funnel 25a is mounted on a swivel arm 25 such that the funnel may be swung over the center of the pressure vessel allowing casting material to be poured into the pressure vessel when the lid 10 is removed from the vessel.

The various controls utilized to operate the centrifugal casting and curing apparatus are also illustrated in FIG. 1 and include a valve arm 15 which operates the water control valve disposed within the housing 14. As will be seen when the valve 15 is moved from its center position to the fill position water enters the pressure vessel and when the valve 15 is moved into the drain position water is drained from the pressure vessel. Gauge 16 is a pressure gauge and indicates the pressure within the pressure vessel. The pressurizing valve 17 couples the pressure vessel with a regulator and source of gas and enables the pressure vessel to be pressurized at an appropriate time. Water level indicating light 18 illuminates when the pressure vessel has been filled with water to a predetermined level. The start button and operating light 19 is utilized to initiate the curing cycle, the light remains illuminated during the curing cycle. The heater "on" indicator light illuminates when the heater disposed within the pressure vessel is on. The heater is utilized to heat the water within the vessel during the curing cycle. The rotor speed control knob 21 controls the operation of the rotor disposed within the pressure vessel and allows the speed of the rotor to be varied. As will be seen, this is an important feature of the apparatus since in casting dental restorations, teeth placed within the molds should not be dislodged from acceleration. The temperature gauge 22 indicates the water temperature of the water within the pressure vessel.

As previously mentioned, the casting and curing machine is particularly adaptable for use in the dental industry where a plurality of dental restorations are to be simultaneously cast and then cured. The following description is oriented towards such applications, even though the apparatus may have other applications. First, a brief description of the operation of the apparatus will be given since this will facilitate the explanation of the various components utilized in the apparatus.

Figure 2:
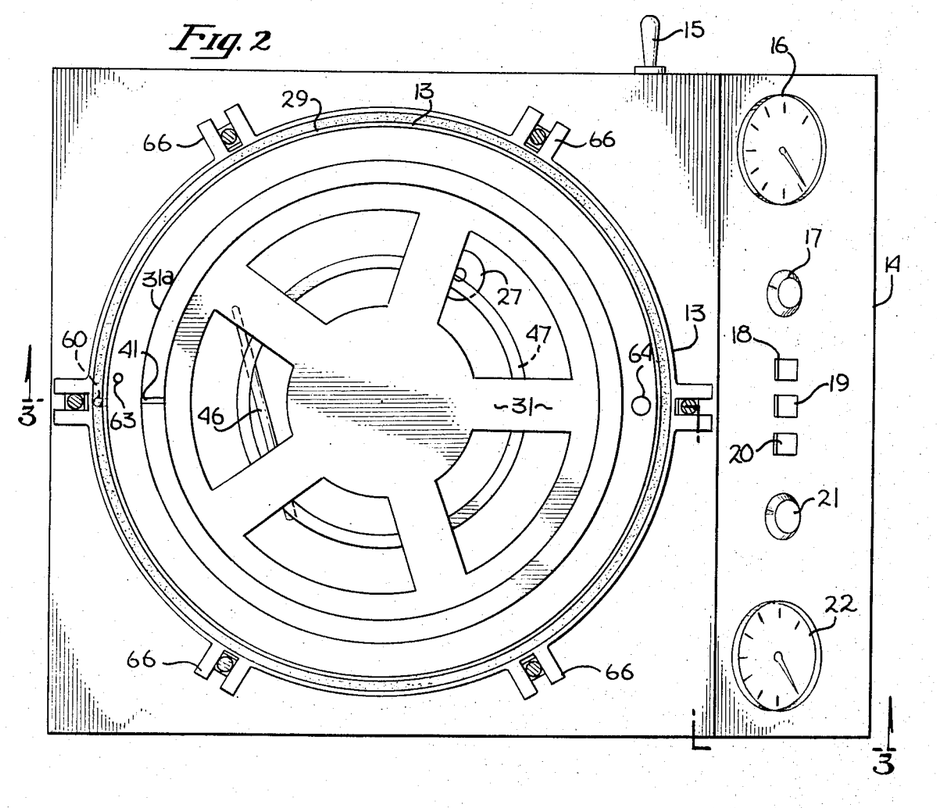
FIG. 2 is a top cross sectional view of the apparatus of FIG. 1 taken through section line 2—2 of FIG. 1.
Figure 3:
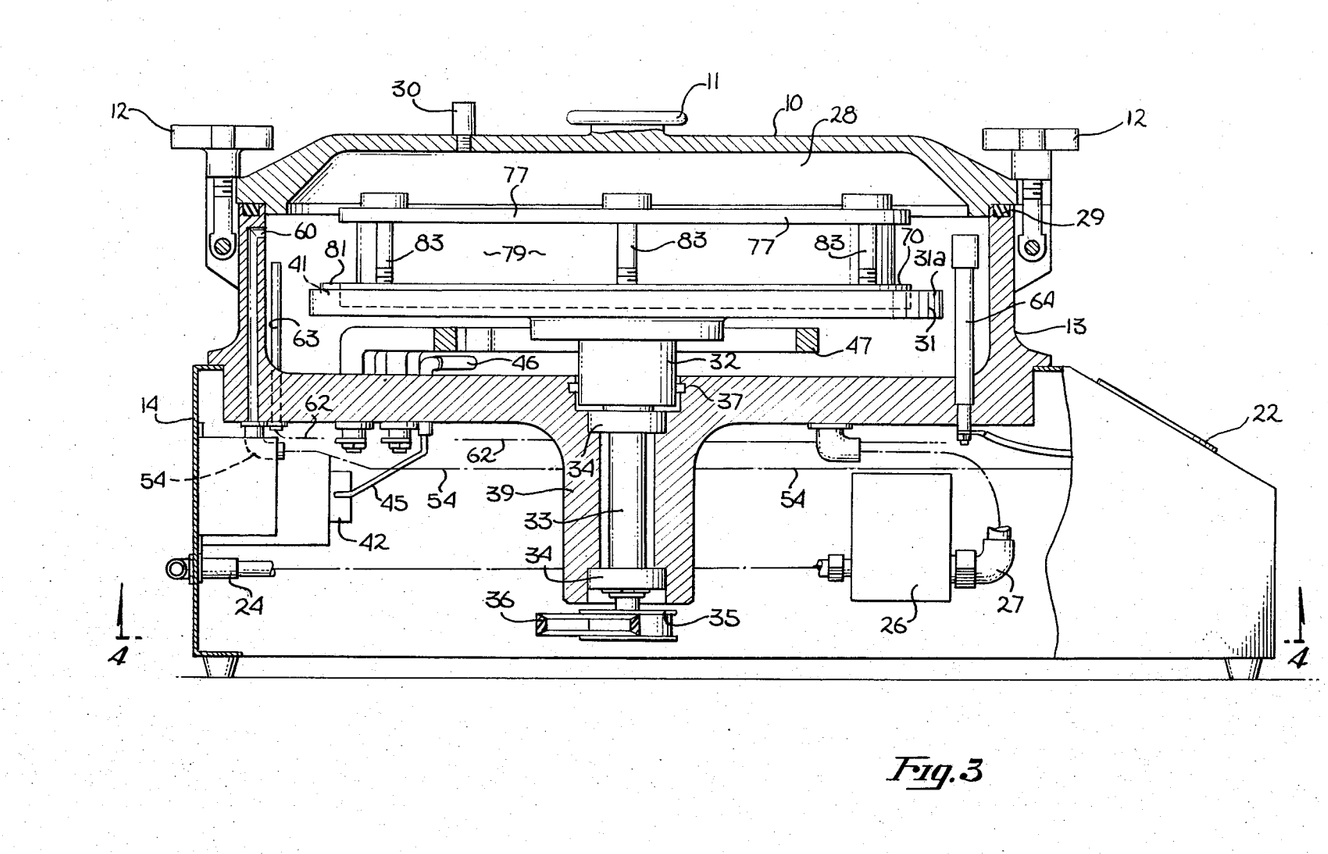
FIG. 3 is a side cross sectional view of the apparatus of FIG. 1 taken through section line 3—3 of FIG. 2.
Figures 5A, 5B, 5C, 5D, 5E:
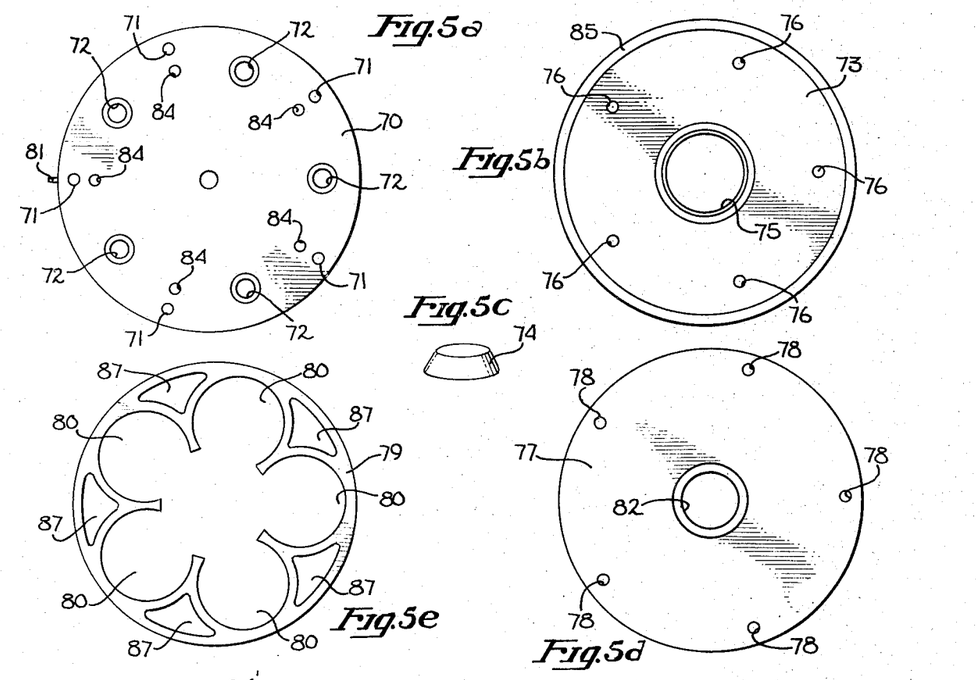
FIGS. 5a through 5e illustrate the flask assembly into which the casting material is poured when the assembly is engaging the rotor assembly.

After the molds which define the object to be cast, such as the dental restorations, have been placed within the flask assembly, various parts of which are shown in FIGS. 5, the flask assembly is placed upon the rotor 31 shown in FIGS. 2 and 3. Next, with the lid removed, the casting material which in the presently preferred embodiment, comprises an acrylic resin, is slowly poured into the center of the flask while the rotor begins to rotate. After sufficient resin has been poured into the flask assembly and the casting has been completed, the rotor is stopped and the lid 10 is placed upon the pressure vessel body 13. After the clamps 12 have been tightened the pressure vessel is filled with water to a predetermined level and the pressure vessel is also pressurized to a pressure of approximately 25 PSI. In the presently preferred embodiment, after approximately 15 minutes, the heater element disposed within the pressure vessel is activated automatically, heating the water in the vessel to a temperature of approximately 150° F. After this temperature has been reached the acrylic castings are allowed to cure for approximately 30 minutes and then the pressure vessel is drained and depressurized, completing the curing cycle.

Referring now to FIGS. 1 through 4, the pressure vessel includes a generally cylindrically shaped body 13 adaptable at one end for receiving the generally circular shaped lid 10. An O-ring 29 is disposed about the upper annular surface of the body 13 such that the lid 10 may be sealed to the upper surface of the pressure vessel body 13. A plurality of clamps 12 are each coupled at one end to the body 13 between a pair of spaced apart ears 66. The other end of the clamps include knobs which allow the clamp to be manually tightened between radially disposed ears on the lid 10. The lower end of the pressure vessel body 13 includes an elongated axially disposed stem 39 which houses a drive shaft 33. The lid 10 in combination with the pressure vessel body 13 define a volume 28. It is this volume which is filled with water to a predetermined level and which is also pressurized during the curing cycle. In the presently preferred embodiment the pressure vessel body 13 and the lid 10 are cast metal members of suitable strength to more than withstand the pressures placed within the volume 28.

During the centrifugal casting the flask assembly is placed upon the circular rotor 31 most clearly seen in FIG. 2. The flask rotates with the rotor 31 and includes a drive pin which engages the radially disposed rotor slot 41 so that the rotor and flask rotate together. The wheel 31 includes an outer rim 31a into which the base plate of the flask assembly, gel pouring plate 70 (FIG. 5a) is placed as is best illustrated in FIG. 3. The rotor 31 includes a concentrically mounted cylindrical rotor base 32 most clearly illustrated in FIG. 3. The base 32 is mounted within the cylindrical interior of the stem 39. A seal 37 coupled to the pressure body 13 and disposed about the rotor base 32 provides a seal between the volume 28 and the remainder of the apparatus including the stem 39 and the volume defined by the base housing 14. The rotor base 32 is concentrically mounted to a shaft 33 which is mounted for rotation within the stem 39 on bearings 34.

Figure 4:
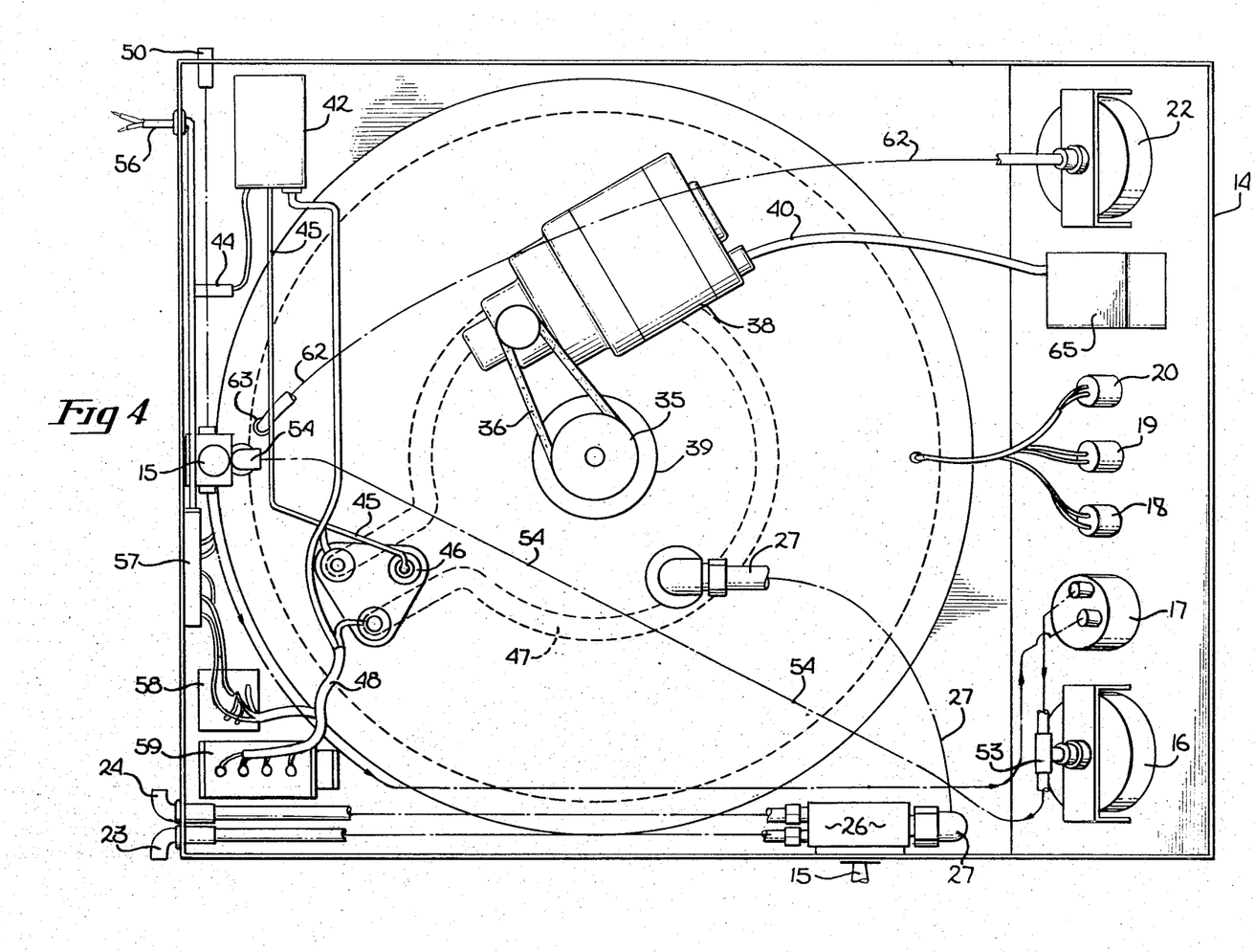
FIG. 4 is a bottom cross sectional view of the apparatus of FIG. 1 taken through section line 4—4 of FIG. 3.

The lower end of the shaft 33 as may be best seen in FIG. 4, is coupled to a sprocket wheel 35. The sprocket wheel is coupled to a motor and gear box 38 by means of a chain 36. Thus, as the motor and gear box 38 are activated the shaft 33 and the rotor 31 will rotate about their common axis providing the centrifugal force utilized to urge the casting material into the molds during the casting operation.

Figure 6:
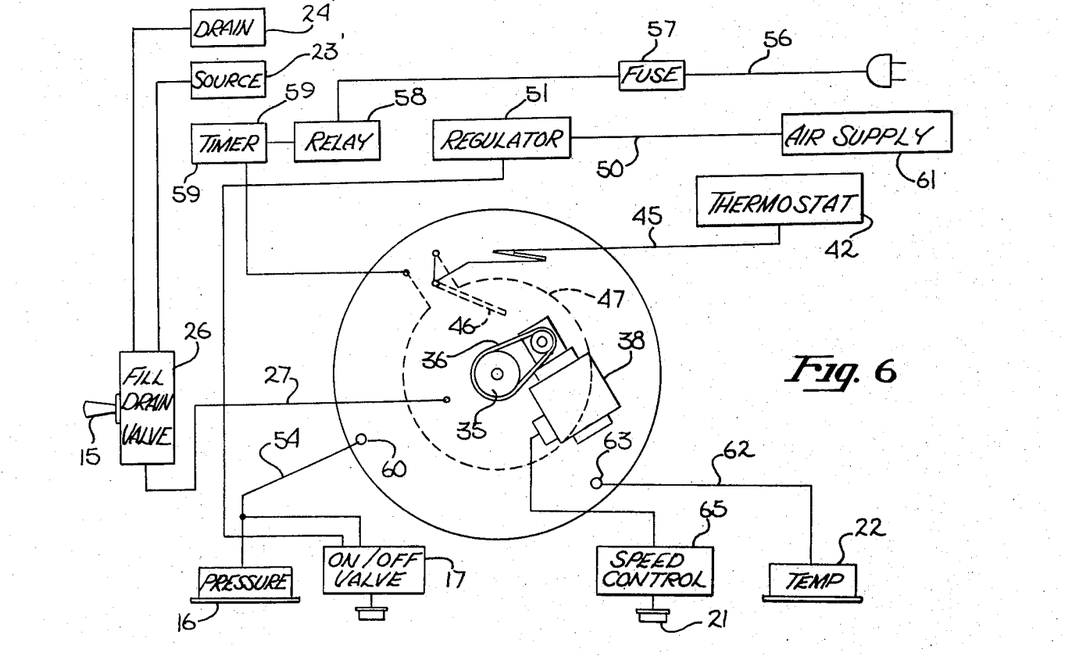
FIG. 6 is a schematic illustrating the various control means used to control the apparatus of FIG. 1.

Referring to FIGS. 4 and 6, the rotor speed control knob 21 is coupled to a reostat 65 which in turn is coupled to the motor and gear box 38 via lead 40. It has been found that in centrifugally casting dental restorations that there should be no sudden accelerations since the resulting forces exerted on the molds tend to move the teeth which are placed within the molds.

The housing 14 which may be an ordinary metal housing which houses the underside and stem of the pressure vessel body 13 and the driving means for driving the rotor also houses all the controls for the unit including those controls which allow the water and pressure to flow into the pressure vessel and the heater controls to heat the water in the vessel. The beveled front of the housing 14 defines the control panel upon which the gauges and other controls discussed in conjunction with FIG. 1 are mounted.

Referring to FIG. 3, the water control system for the apparatus includes a water inlet line 23 and a water drain line 24. The external end of line 23 may be coupled to any source of water while the external end of line 24 is connected to a drain. Both lines 23 and 24 are connected directly to the water selector valve 26. (Note that in some of the Figures various lines have been shown partly with broken lines to simplify the drawings.) This valve is controlled by the previously described valve arm 15. The output of valve 26 is coupled to the pressure vessel water line 27 which is shown in part as a broken line in FIGS. 3 and 4. Line 27 which communicates with the interior of the pressure vessel allows water to fill and be drained from the vessel. Valve 26 has three positions for alternately allowing the water inlet line 23 to be coupled to line 27, the water drain line 24 to be coupled to line 27 and a third, neutral position, in which line 27 is blocked by the valve 26. Any one of numerous commercially available valves may be used for the water selector valve 26. As is most clearly illustrated in FIG. 3, a water level sensor 64 is mounted within the interior of the pressure vessel and is coupled electrically to the water level indicator light 18. Sensor 64 supplies a signal to light 18 when the water level in the pressure vessel reaches approximately the upper end of the sensor. The upper end of the sensor is disposed immediately below the upper end of the body 13. Thus the indicator light 18 will illuminate when the water in the vessel is filled to a point below the lid 10.

An electrical heating element 47 having a general circular shape as may be seen in FIGS. 3 and 4 is disposed within the pressure vessel below the rotor 31. The heating element is coupled to a timer 59 by leads 48 and to a thermostat 42. This heating element heats the water in the vessel during the curing cycle; the water is maintained at a predetermined temperature by thermostat 42. A temperature sensing probe 46 which is mounted within the pressure vessel below the heating element 47 is coupled to the thermostat 42 via lead 45. The thermostat 42 is electrically coupled to a thermostat control adjustment 44 which is primarily used when the unit is initially assembled. The heating element 47 is coupled to light 20; this light illuminates when power is being supplied to the heating element 47. Temperature gauge 22 is coupled by lead 62 to a thermocouple probe 63 which is mounted within the pressure vessel. Thus the reading on gauge 22 is the temperature within the vessel.

In the presently preferred embodiment the inlet air line 50 is coupled to an external supply of pressurized air of approximately 80 PSI. As will be readily apparent, other sources of gas, such as carbon dioxide or nitrogen, may be utilized. The inlet air line 50 is coupled to a regulator 51 which regulates the inlet air to a pressure of 25 PSI in the presently preferred embodiment. The outlet of regulator 51 is coupled to the inlet of the pressurizing valve 17, and the outlet of pressurizing valve 17 is coupled to the T connector 53 which is a part of the pressure gauge 16. The T connector 53 is also coupled to the pressure vessel air line 54 shown as a broken line in FIGS. 3 and 4. Line 54 terminates in a fitting disposed beneath the outer wall of body 13 and communicates with the interior of the pressure vessel through an elongated passage defined by the pressure vessel body and which terminates in port 60. Port 60 is above the water line of the vessel thus allowing the vessel to be pressurized without causing turbulence in the water. The valve 17 which may be a two position valve, in one position allows air to flow from a source of air into the vessel and in the second position, disconnects the path from the source of air to the pressure vessel and additionally allows the pressure vessel to vent through the valve 17.

Referring primarily to FIG. 6, the various controls and external supplies for the centrifugal casting and curing apparatus are illustrated in schematic form. The pressurizing system is illustrated coupled to air supply 61 via the inlet air line 50 which in turn is coupled to the regulator 51. The output of the regulator 51 after passing through the on-off valve 17 is coupled to the pressure vessel port 60 via line 54 after being coupled to the pressure gauge 16. As is apparent from the drawing after the lid has been secure on the pressure vessel body the pressure vessel may be pressurized by moving valve 17 to its "on" position. When this occurs air will flow from air supply 61 into the vessel, pressurizing the vessel, in the presently preferred embodiment, to approximately 25 PSI. The pressure in the vessel may be read by pressure gauge 16. When it is necessary to depressurize the vessel valve 17 is moved to its "off" position allowing the air in the vessel to vent through the valve 17.

The water supply system for the apparatus is illustrated coupled to drain 24' and a water source 23'. When it becomes necessary to fill the vessel with water the valve arm 15 is moved to the "fill" position and water enters the vessel from the source 23'. When the water level in the vessel reaches a predetermined level the level indicator light 18 illuminates indicating that the valve arm 15 should be moved to its neutral position. When it is time to drain the vessel the valve 15 is moved to the drain position allowing water to flow from the vessel into the drain 24'.

Electrical power is supplied to the apparatus via line 56 which is coupled through fuse and junction box 57 to relay 58. Through leads not shown power from the fuse and junction box 57 is supplied to the speed control means, reostat 65 allowing the speed of motor and gear box 38 to be controlled by knob 21. Knob 21 also has an "off" position allowing the motor and gear box to be completely deactivated. (The desired rate of rotation for centrifugal casting in dental applications will be discussed later.) Relay 58 is coupled to the start button and operating light 19 of FIGS. 1 and 4 and when the start button has been depressed relay 58 allows electrical power to flow into timer 59. The timer 59 is used to control the heating element 47. Any one of numerous commercially available timers may be utilized for timer 59. When power is first supplied to the timer 59 it prevents power from flowing into the heater element 47 for approximately 15 minutes. Thus, water within the pressure vessel will remain unheated for this period of time. Following this the timer couples power into the heating element for a period of approximately 45 minutes. At the end of this 45 minute period the curing cycle is over and the timer through the relay 58 causes the light associated with the start button to turn off indicating that the curing is completed. During the time that power is supplied to the heating element 47 the thermostat control 42 controls the flow of power into the heating element 47 such that the temperature of the water is maintained at approximately 150° F. Because of the volume of the pressure vessel and the size of the heating element 47 in the presently preferred embodiment it takes approximately 15 minutes for the water in the vessel to reach 150° F. Thus, curing at 150° F. continues for approximately 30 minutes at that temperature.

Referring to FIGS. 5a through 5e, the various components of the flask assembly are illustrated; note that the relative scale of these components compared to the remainder of the drawings is somewhat smaller. The gel pouring plate 70 which fits with the rim 31a of rotor 31 (FIG. 3) includes five tapered pouring ports 72 evenly spaced near the edge of the plate 70. In between each of the ports 72 are a pair of apertures 71 and 84, the apertures 71 are threaded and receive bolts when the flask is assembled as will be explained. A drive pin 81 is radially disposed from the edge of plate 70. This pin is for engaging the slot 41 of rotor 31 (FIG. 2).

In FIG. 5b the gel forming plate 73, which is a circular plate having approximately the same diameter as plate 70, is illustrated. The plate includes a rim 85 of a diameter approximately equal to the diameter of casting flask 79 shown in FIG. 5e such that the casting flask may rest within the rim 85. Five threaded apertures 76 are evenly disposed about the plate 73 and are aligned with the apertures 84 of the gel pouring plate 70. A centrally located tapered plug aperture 75 is disposed through the gel forming plate 73 for receiving the tapered resilient plug 74 shown in FIG. 5c.

The resin pouring plate 77 (FIG. 5d) which has a diameter approximately equal to plates 70 and 73 includes a centrally disposed tapered or beveled aperture 82 and five evenly spaced apertures 78. The apertures 78 are aligned with the threaded apertures 71 of the gel pouring plate 70.

The generally cylindrically shaped flask 79 has an axially disposed clover-leaf shaped bore which defines five (5) areas 80. These areas are the areas in which the molds are placed during the casting process. The five evenly spaced openings 87 are aligned with the bolt receiving apertures in the plates of FIGS. 5a, b and d, such as apertures 84, 71, 76 and 78.

The purpose and to some extent the structure of the flask assembly will become more apparent with the following description concerning the use of the flask assembly in conjunction with the use of the casting and curing apparatus.

Assume that five models for partial dentures consisting of stone, wax and teeth (or metal skeleton) are to be prepared for casting utilizing the disclosed apparatus. These models are positive models of the patient's inner mouth. First, the models are waxed as is normally done in the preparation of partial dentures. The waxed patterns are refined so they closely resemble the desired finished dimensions of the denture. The models are trimmed preferably with a slight bevel and the base ground so that the model will fit flatly on a flat surface. It may be necessary for an irregularly shaped model or unusually thin models to pour a base. Waxed sprue leads and waxed air vents are also placed on the models as is presently done for the manual casting of dentures.

Referring to FIG. 5b and 5e, the casting flask 79 is placed upon the gel forming plate 73 such that the aperture 76 are exposed through the openings 87. Next the models are carefully placed on the gel forming plate 73 in the casting areas 80. Note that up to five models may be placed in the five casting areas 80. An adhesive may be used to hold the models onto the gel forming plate 73. The plug 74 is placed within the aperture 75 and then the gel pouring plate 70 is placed on the upper surface of the casting flask 79. Bolts 83 shown in FIG. 3 are then placed through the apertures 84 and into the threaded apertures 76 of plate 73. These bolts pass through the openings 87 of the casting flask 79. Next a duplicating material referred to herein as a gel is poured through the pouring port 72 of the gel pouring plate 70. A funnel or cup may be placed above each of the ports 72 in order to assure that the gel is poured into the ports.

After this gel has cooled and any pouring sprue extending from the port 72 have been cut flush with the plates 70 the bolts 83 are removed. Next, the flask assembly is turned over such that the gel forming plate 73 is on the top and the gel pouring plate 70 is on the bottom. After the gel forming plate 73 is removed, the models are then removed from the duplicating material or gel, and the wax and teeth are removed from the model by known techniques. Sprue holes of approximately ¼ inch in diameter are cut from the central portion of the gel into each of the negative impressions left when the models are removed. Additionally, a vent hole of approximately ⅛ inch in diameter is cut above the sprue holes into each of the impression areas. The teeth that have been removed from the model are then placed in proper sequence into the gel and the models with the wax removed are placed back into the gel in their appropriate impression, as is presently done with the manually cast dentures. The plug 74 is next inserted into the center of the gel with the smaller end of the plug facing downward. Following this the resin pouring plate 77 is placed upon the casting flask 79 and the bolts 83 are inserted through the apertures 78 into the threaded apertures 71 of the gel pouring plate 70. The entire flask assembly is then placed upon the rotor wheel 31 as shown in FIG. 3 such that the drive pin 81 engages the slot 41.

In the presently preferred embodiment an acrylic resin is utilized as the casting material and for the purposes of this description it will be assumed that the polymer and monomer typically comprising the acrylic resin have been properly mixed and are prepared for pouring. With the lid 10 open so that the acrylic resin may be poured into the flask assembly, the rotor wheel 31 is made to rotate by slowly turning the rotor speed control knob 21. Care must be taken to start the rotor wheel very slowly since a sudden acceleration would cause the teeth which have been set in the gel to become dislodged and improperly oriented. Once the rotor wheel 31 has been brought up to speed the resin is poured onto the edge of the plug 74 through the funnel 25a shown in FIG. 1. Sufficient resin is poured to fill the cavities defined by the molds. The rotation is continued until bubbles cease to emerge from the resin indicating that the volumes to be cast are filled. In practice the rotation continues from about 30 seconds to about 2 minutes, depending upon the volume being cast.

In the presently preferred embodiment the centrifugal casting is performed at approximately 160 RPM. It has been found that a range between 110 to 180 RPM is satisfactory. At 160 RPM's the acceleration on the molds, assuming that the molds are approximately six inches from the center of rotation is approximately 141 feet per second squared ($W^2R$). Acceleration greater than that produced at 180 RPM's may cause the teeth to become dislodged.

After the casting has been completed and the rotor stopped the valve arm 15 is moved into the fill position allowing water to enter the pressure vessel. The pressure vessel is filled until the water level indicator light 18 illuminates and then the valve arm 15 is moved into its neutral postion. Next the lid 10 is placed upon the pressure vessel body and the clamps 12 are tightened, securing the lid on the body. Following this the pressurizing valve 17 is turned to the "on" position. This allows air to flow through the regulator, this air enters the pressure vessel through port 60 and pressurizes the vessel to approximately 25 PSI. Then the start button and operating light 19 is depressed. This allows power to flow into the timer 59. As previously mentioned, heat is not applied to the water for the first 15 minutes and thus the freshly cast resin is allowed to sit in water generally at a temperature of approximately 70° F. During this time there is typically an exothermic reaction occuring in the acrylic and the heat from this reaction is removed during this period. Following this 15 minute period the timer 59 actuates the heating element and the water is heated to a temperature of approximately 150° F. plus or minus five degrees. In the presently preferred embodiment approximately 15 minutes is required for the water to be heated to the desired temperature. The water remains at 150° F. for a period of 30 minutes, the current to the heating element being controlled during this time by the thermostat control 42.

Experimentation has shown that with the commonly used acrylic materials the curing of 30 minutes at 150° F. may also be performed at 140° F. but the curing time for this temperature is approximately one hour. While the curing time may be shortened by the use of higher pressure and/or higher temperatures, higher temperatures and pressures are not practical since they cause the gel to deteriorate or become compressed.

After the end of the 30 minute curing period the light 19 will go out indicating that the curing cycle is completed. To remove the flask assembly from the apparatus first the valve arm 15 is moved to the drain position allowing the water to drain from the unit. Note that the air pressure in the unit forces the water from the unit, thus, the pressurizing valve 17 is left in the "on" position when the water is being drained from the pressure vessel. Next, the pressurizing valve 17 is moved to the "off" position, this allows the air in the vessel to bleed out through the valve 17. Finally, the lid may be removed and after the flask assembly has been given time to cool it may be disassembled and the completed castings removed from the flask assembly.

Thus, a centrifugal casting and curing apparatus has been disclosed which provides castings of far superior quality than those provided with the prior art. The apparatus automatically controls the curing time and temperature, thereby assuring proper curing and assuring a high quality dental restoration. As previously mentioned, it has been found that with the use of centrifugal casting and the above described curing process, castings are made which have considerable less shrinkage than those made with prior art techniques.

We claim:

1. An apparatus for centrifugal casting and for curing dental restorations comprising:
   a housing defining a pressure vessel;
   a rotor assembly for rotation disposed within said housing for centrifugally casting said dental restorations;
   water flow control means for permitting water to enter said pressure vessel for curing said dental restorations after casting and to be drained from said pressure vessel coupled to said housing;
   heating means for heating water in said vessel;
   gas flow control means for permitting gas to enter and leave said pressure vessel such that said vessel may be pressurized for curing said dental restorations; and,
   a flask including a plurality of sections for receiving dental restoration molds coupled to said rotor assembly for rotation with said assembly during said centrifugal casting;
   whereby a plurality of dental restorations may be centrifugally cast simultaneously in said flask and then cured in said vessel.

2. A casting and curing apparatus for simultaneously centrifugally casting and then curing a plurality of dental restorations comprising;
   a pressure vessel which includes a manually removable lid;
   a motor and rotor assembly, said rotor assembly being disposed within said vessel;
   a flask coupled to said rotor assembly for rotation with said rotor assembly, said flask including a plurality of separate areas for receiving a plurality of dental restoration molds and which includes a central area into which a casting material may be poured;
   flow control means for controlling the flow of gas and water into and out of said vessel for curing said dental restorations after casting; and,
   heating means, coupled to said vessel for heating the water in said vessel when said dental restorations are being cured;
   whereby a plurality of dental restorations may be simultaneously cast in said flask and then cured in said vessel with the use of pressure and heat.

3. The apparatus defined in claim 2 including control means for automatically controlling the temperature of water in said vessel by selectively operating said heating means and for deactivating said heating means after a predetermined period of time.

4. The apparatus defined in claim 3 including motor control means for controlling the rate of rotation of said rotor.

5. An apparatus for simultaneously casting and simultaneously curing a plurality of dental restorations comprising:
   a housing;
   a pressure vessel mounted within said housing;
   a rotor mounted for rotation in said vessel;
   a motor mounted in said housing;
   a drive shaft means interconnecting said motor and rotor such that said rotor may be rotated for centrifugal casting of said dental restorations;
   a source of gas;
   gas flow control means coupled to said housing and interconnecting said source of gas with said vessel for controlling the flow of gas into said vessel for curing said dental restorations;
   liquid flow control means, coupled to said housing for controlling the flow of liquid into said vessel for curing said dental restorations after casting;
   heater means mounted in said vessel for heating liquid in said vessel; and
   holder means, for securing a plurality of molds to said rotor, for rotation with said rotor;
   whereby a plurality of restorations may be cast within said molds and then cured in said pressure vessel.

6. The apparatus defined in claim 5 wherein said vessel includes a manually removable lid.

7. The apparatus defined in claim 6 wherein said holder means is removably mounted on said rotor.

8. The apparatus defined in claim 7 including motor control means for controlling the rate of rotation of said rotor.

9. The apparatus defined in claim 5 wherein said holder means comprises:
   a first plate;
   a casting flask, for engaging said first plate, defining with said first plate a plurality of areas for receiving molds, and,
   a resin pouring plate, for engaging said casting flask, said pouring plate including an aperture into which resin may be poured, and
   securing means for securing said first plate, casting flask and said resin pouring plate to one another.

10. The apparatus defined in claim 9 wherein said holder means also includes a gel pouring plate having a plurality of apertures for pouring gel into said plurality of areas.

11. The apparatus defined in claim 10 wherein said first plate includes a centrally disposed aperture for receiving a plug.

12. An apparatus for centrifugally casting and for curing a plurality of dental restorations comprising:
   a housing defining a pressure vessel;
   a rotor assembly disposed for rotation within said housing for centrifugally casting said dental restorations;
   water flow control means for permitting water to enter said pressure vessel for curing said dental restorations after said casting and to be drained from said pressure vessel, coupled to said housing;
   holding means, for securing a plurality of molds defining said dental restorations, said holding means comprising:

a. a first plate;
b. a casting flask, for engaging said first plate, defining with said first plate a plurality of areas for receiving molds;
c. a resin pouring plate for receiving said casting flask, said pouring plate including an aperture into which resin may be poured; and,
d. securing means for securing said first plate, casting flask and said resin pouring plate to one another;

whereby a plurality of dental restorations may be simultaneously cast and then cured within said vessel.

13. The apparatus defined in claim 12 wherein said holding means also includes a gel pouring plate having a plurality of apertures for pouring gel into said plurality of areas.

14. The apparatus defined in claim 13 wherein said first plate of said holding means includes a centrally disposed aperture for receiving a plug.

* * * * *